United States Patent

[11] 3,631,347

[72] Inventor Jack R. Chipman
Fort Wayne, Ind.
[21] Appl. No. 780,992
[22] Filed Dec. 4, 1968
[45] Patented Dec. 28, 1971
[73] Assignee The Magnavox Company
Fort Wayne, Ind.

[54] METHOD AND APPARATUS FOR FINE TUNING FOR A TELEVISION SET HAVING BOTH VHF AND UHF RANGES

5 Claims, 3 Drawing Figs.

[52] U.S. Cl. 325/418, 325/461
[51] Int. Cl. H04b 1/16
[50] Field of Search 325/416, 417, 418, 419, 420, 423, 461, 422, 40, 460; 178/5.8 AF; 334/13

[56] References Cited

UNITED STATES PATENTS

| | | | |
|---|---|---|---|
| 2,891,105 | 6/1959 | Keizer | 178/5.8 |
| 2,953,637 | 9/1960 | Baugh, Jr. | 178/5.8 |
| 3,241,072 | 3/1966 | Brand | 325/461 X |
| 3,242,433 | 3/1966 | Carlson et al. | 325/461 |

*Primary Examiner*—Robert L. Griffin
*Assistant Examiner*—R. S. Bell
*Attorney*—Richard T. Seeger

ABSTRACT: The invention relates to an automatic fine tuning system, especially for televisions, having both VHF and UHF ranges in which a frequency discriminator has its input connected to an intermediate frequency stage of the television and supplies a voltage signal to adjust the frequency of the local oscillator in the set in a direction to maintain the intermediate frequency substantially constant, and wherein the full voltage of the discriminator output is employed during VHF operation and a predetermined fractional part of the said voltage is employed during UHF operation.

INVENTOR
JACK R. CHIPMAN

BY Jeffers and Young
ATTORNEYS

METHOD AND APPARATUS FOR FINE TUNING FOR A TELEVISION SET HAVING BOTH VHF AND UHF RANGES

The present invention relates to television receiver circuits and is particularly concerned with automatic fine tuning, or automatic frequency control arrangements in such circuits. More specifically still, the present invention concerns an automatic fine tuning arrangement for television receiver circuit arranged for both very high frequency (VHF), and ultra high frequency (UHF) reception.

Television receiver circuits having automatic fine tuning arrangements are known and automatic fine tuning, or automatic frequency control, arrangements are furthermore known in connection with radios, particularly in frequency modulation (FM) radios.

Such fine tuning circuits employ a known frequency discriminator circuit which provides an output which is employed to regulate conditions in the oscillator circuit to adjust improper conditions of frequency. Somewhat more specifically, a television circuit will embody an oscillator, referred to as a local oscillator, which supplies a frequency differing from the frequency of a received signal by a specific predetermined amount, referred to as the intermediate frequency. When the frequency of the oscillator and the frequency of the signal are brought together in separate coils in a transformer arrangement, with the aid of a nonlinear device, such as a diode, the two frequencies produce a beat frequency at the said predetermined intermediate frequency.

From the point where the incoming signal is beat down to the intermediate frequency, the entire circuitry is designed specifically for the intermediate frequency and any variation therefrom will result in faulty reproduction of one or both of the picture and the sound. It is thus highly important that the intermediate frequency be exactly that for which the major portion of the circuit of the television receiver is designed.

The problem of the frequency of the local oscillator in the receiving set drifting, or of the set being improperly tuned is taken care of in the manner generally referred to above, namely, by adjusting the local oscillator in the set in conformity with the signal derived from a frequency discriminator circuit which is supplied at its input side with the aforementioned intermediate frequency.

The frequency discriminator is so designed, according to known practices that, at the desired intermediate frequency for which the circuit of the television receiver is designed, there is zero voltage output at the output side of the frequency discriminator circuit. When the intermediate frequency at the input side of the frequency discriminator circuit varies in one direction from that desired, the voltage at the output of the frequency discriminator rises and, when the said input frequency varies in the other direction, the voltage at the output of the frequency discriminator circuit varies in the opposite direction. For a limited range of frequency variations, the output voltage of the frequency discriminator circuit varies substantially linearly through zero and at an incline determined by the parameters of the particular circuit employed.

The difficulty that arises in connection with adapting this automatic fine tuning, or automatic frequency control, system to a television having both VHF and UHF channels is, in part, due to the fact that the carriers for the television picture and the carrier for the television sound are only about 4.5 megacycles away from each other. In the VHF range no possibility exists of the automatic frequency discriminator locking in on the wrong carrier but this can occur in the UHF range and, in particular, because the oscillator sensitivity under UHF operation is increased through the use of harmonics of the normal VHF oscillator.

The use of harmonics increases the sensitivity of the oscillator substantially but can cause an automatic fine tuning, or an automatic frequency control, to lock out on the sound carrier. This can occur, for example, due to a switching transient, or from improper tuning or from drifting of the local oscillator frequency, particularly during warm up of the set. None of these conditions interfere with the automatic fine tuning or automatic frequency control on VHF because the oscillator frequency in the circuit does not vary far enough to permit the frequency discriminator circuit to lock in on the sound carrier.

With the foregoing in mind, it is a particular object of the present invention to provide an automatic fine tuning or automatic frequency control system for a television in which the system is operable on the UHF channels as well as on the VHF channels.

Another object of this invention is the provision of an automatic fine tuning or automatic frequency control system which is adjustable automatically as to sensitivity in response to adjustment of the tuner of the television set in which the system is incorporated whereby the system is adapted for operation with the highest frequency channels received.

Still another object of this invention is the provision of a method of operating a television set having both VHF and UHF ranges in which the benefits of automatic fine tuning or automatic frequency control is available for both of said ranges without requiring any special adjustments to be made.

A still further object of the present invention is the provision of an automatic fine tuning or automatic frequency control system for a television set having both VHF and UHF ranges in which the system operates in the optimum manner in both ranges.

It is also an object of this invention to provide for a television set having both VHF and UHF ranges having an automatic fine tuning system in which the system is prevented from detecting any signal other than the signal with which it is adapted for cooperation so that the circuit operates properly under all possible received frequencies.

The foregoing objects as well as still other objects and advantages of the present invention will become more apparent upon reference to the accompanying drawings, in which.

BRIEF SUMMARY OF THE INVENTION

The present invention contemplates supplying the input of a frequency-discriminating circuit by the intermediate frequency stage of a television receiver circuit and employing the output of the frequency discriminator circuit for adjusting the frequency of the local oscillator in the television circuit. The invention further contemplates utilizing the output from the frequency discriminator circuit directly, at undiminished voltage, when the television circuit is operating in the VHF range and reducing the voltage of the output of the frequency discriminator circuit when the television set is operating in the UHF range.

This is accomplished by connecting one end of a voltage divider to the output of the frequency discriminator circuit and connecting an intermediate point thereof to the local oscillator in the television set for supplying the regulating voltage thereto. In the VHF range of the television set the other end of the voltage divider is disconnected from ground so that the voltage of the signal from the frequency discriminator circuit to the local oscillator is undiminished, whereas, when the set is operating in the UHF range, the end of the voltage divider opposite the frequency discriminator circuit is connected to ground whereby the voltage supplied from the frequency discriminator circuit to the local oscillator is diminished.

Figure 1:
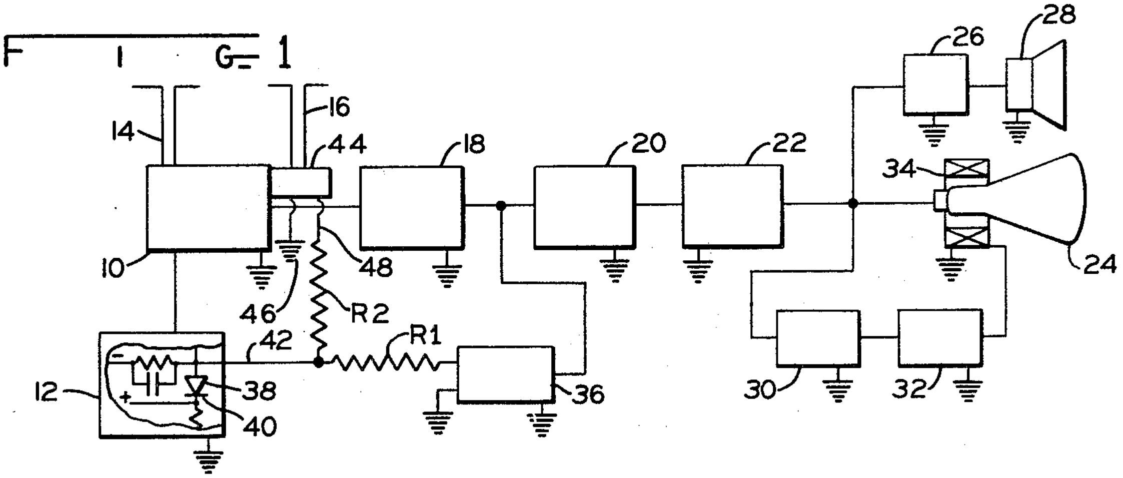
FIG. 1 is a schematic partial view of a television circuit, simplified so as to emphasize the novel circuitry of the present invention, and incorporating the present invention.

Referring to the drawings somewhat more in detail, FIG. 1 shows in highly schematic and simplified form a television receiver circuit in which 10 represents the tuner and 12 represents the oscillator pertaining thereto. The VHF antenna input is indicated at 14 and the UHF antenna input is indicated at 16. Within the tuner stage the incoming signal is beat down to a predetermined intermediate frequency and supplied to the intermediate frequency amplifier 18. Amplifier 18 supplies a detector 20 and an amplifier 22 and amplifier 22 supplies picture tube 24 and the sound channel 26 which includes speaker 28. Amplifier 24 also supplies the sync separator 30 which in turn supplies the horizontal and vertical deflecting coil circuits 32 which will be seen to be connected to the horizontal and vertical deflecting coils 34.

According to the present invention, a frequency discriminator circuit of a known type at 36 has its input connected to receive the signal from the intermediate frequency amplifier stage 18. The output of frequency discriminator circuit 36 is supplied to one end of a voltage divider comprising resistance R1 adjacent to the frequency discriminator and a resistance R2 connected in series therewith.

The oscillator 12 includes a circuit component 38 which is capacitive in nature and the capacitance of which varies in response to a voltage supplied thereto. What is shown at 38 in FIG. 1 is a reverse-biased silicon diode which acts as a capacitor and the capacity of which varies according to the bias thereacross. As shown, component 38 has a small fixed positive DC voltage on the cathode 41 and a small fixed DC negative voltage with AC bypass on the anode 40 with the AFC correction voltage applied to the anode by wire 42 which leads to the junction of resistors R1 and R2.

It will be understood that the showing of component 38 is merely schematic and that it could be included in the oscillator circuit in a number of different ways. In any case, the component 38 forms a portion of the resonant circuit of the oscillator so that changes in capacitance of component 38 change the frequency at which the oscillator operates. The connection of the frequency discriminator to component 38 is such that the voltage at the output side of the frequency discriminator is in a direction to modify the bias on component 38 in a direction to change the oscillator frequency to reduce the output voltage of the frequency discriminator circuit.

Figure 3:
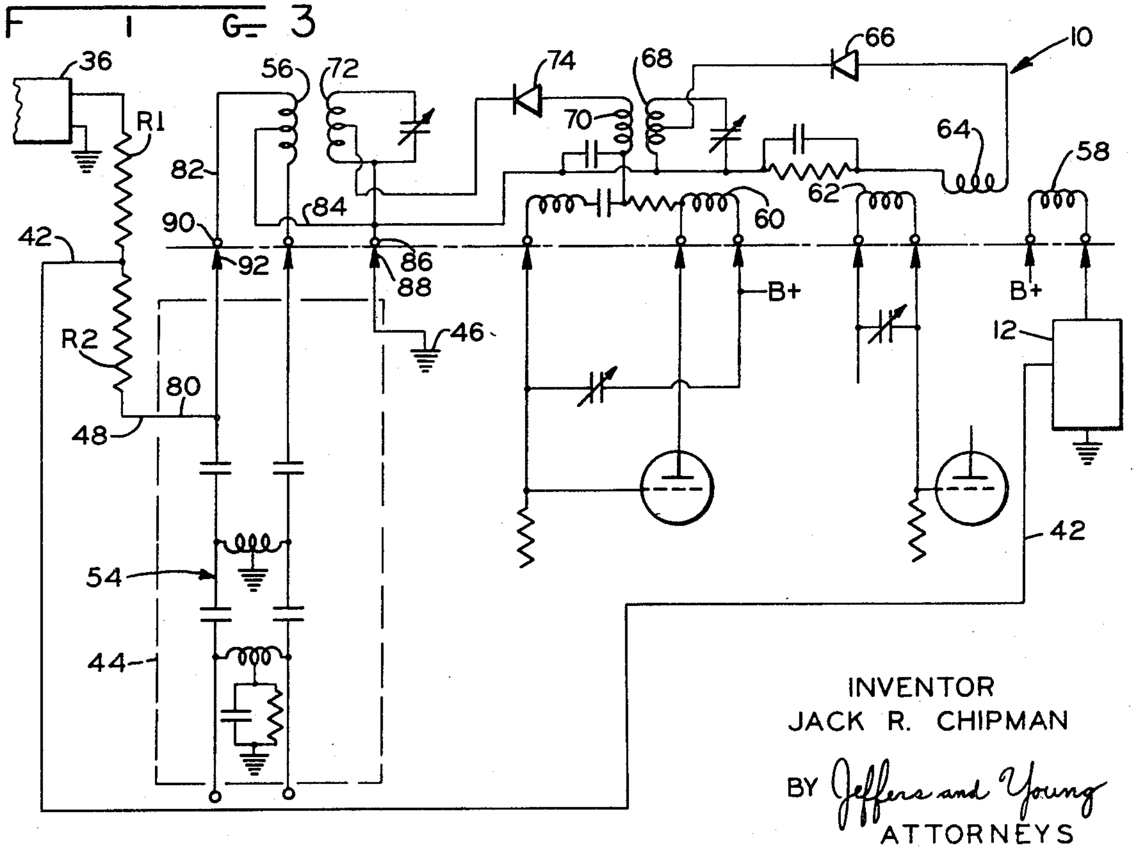
FIG. 3 is a fragmentary schematic view showing a portion of a typical television tuner showing the present invention and having a UHF adapter, with a UHF strip mounted on the tuner.

According to the present invention, the tuner 10 has a UHF adapter 44 and this adapter, shown more in detail in FIG. 3, has a connection to ground at 46 and also is connected by wire 48 with the end of resistor R2 at the end thereof opposite wire 42.

During VHF operation of the set, wires 48 and 46 are disconnected from each other and, inasmuch as substantially no current flows in wire 42, substantially the full output voltage of frequency discriminator 36 is applied to component 38. However, when the set is operating in the UHF range wires 46 and 48 are interconnected so that a current will flow through resistors R1 and R2 to ground whenever there is a voltage at the frequency discriminator circuit output and the voltage applied to component 38 via wire 42 will, therefore, be reduced by the IR drop in resistor R1.

As has been explained above, the reduction in the voltage supplied to component 38 during UHF operation of the set is of merit because it prevents the automatic fine tuning system from locking in on the wrong signal.

This is due to the fact that there is a limit to the amount of correction that can be applied to the oscillator during UHF operation. This comes about because the sound carrier is only 4.5 megacycles away from the picture carrier which is the signal which is employed for automatic frequency control.

As the tuner oscillator is tuned progressively higher in frequency, the output of the frequency discriminator circuit will vary in the normal manner. However, if the local oscillator is tuned beyond the fine tuning range, the automatic frequency discriminator may lock in on the sound carrier wave.

Figure 2:
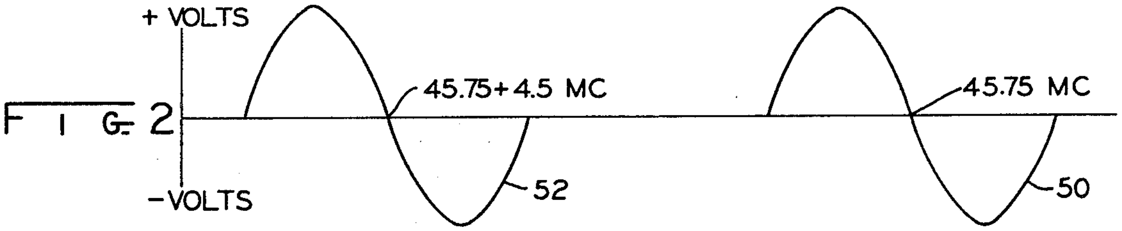
FIG. 2 is a schematic showing of two different conditions that can arise in connection with an automatic fine tuning system.

This can result in the condition shown in FIG. 2, wherein there is discriminator wave marked 50 which pertains to the picture carrier and a second discriminator wave 52 pertaining to the sound carrier wave.

The presence of the second discriminator curve does not cause any difficulties on normal VHF operation because the sensitivities involved do not introduce the second curve. In the UHF ranges, however, the second curve is a distinct possibility.

FIG. 2 shows the relationship between a typical picture carrier and sound carrier for a typical channel. In FIG. 2, the picture carrier is indicated at 50 and the sound carrier at 52 and the picture carrier and sound carrier will be seen to be only 4.5 megacycles apart.

FIG. 3 shows rather schematically a portion of the tuner 10 and associated circuitry. In FIG. 3, the UHF adapter 44 will be seen to comprise an antenna input network 54 which supplies a coil 56 on a UHF strip on the tuner. This strip also comprises a coil 58 for the oscillator which is coupled with coils 60, 62 and 64. Coil 64 is coupled via a harmonic diode 66 with a coil 68. Coil 68 is coupled with a coil 70 which is in circuit with coil 56 and another coil 72 coupled to coil 56 and a mixer diode 7.

This schematically illustrated, and briefly described, known arrangement beats the incoming signal down to an intermediate frequency with the particular intermediate frequency being determined by the frequency of the supply to coil 58 on the UHF strip. Coil 58 is supplied via the aforementioned oscillator 12 which has therein the component 38 connected by wire 42 with the junction of R1 and R2 which are supplied by the frequency discriminator circuit 36.

FIG. 3 will show that the end of R2 opposite its connection to R1 is connected by a wire 80 to one side of the UHF antenna input network at a point therealong which is directly connected by a wire 82 with one end of coil 56. At an intermediate point along coil 56 is connected a wire 84 forming a portion of the circuitry of the strip. Wire 84 is connected to a contact 86 on the tuner which engages a contact 88 on the UHF adapter that is connected to ground via wire 46.

The aforementioned wire 82 is also connected to a contact 90 which is engaged by a contact 92 when the tuner is indexed into a UHF position. In the positions of the tuner corresponding to VHF operation, no contact engages contact 88 so that wire 80 leading from the end of R2 opposite the connection of R2 to R1 is disconnected from ground. When wire 80 is connected to ground there is a reduction in signal strength at the junction of R1 and R2 to which wire 42 is connected and, when wire 80 is connected to ground as shown in FIG. 3, there is a reduction in the said signal strength.

By the present invention it will be seen that the automatic fine tuning circuit is made less sensitive in the UHF range while maintaining the maximum correction factor possible for VHF operation.

The maximum correction factor is desirable because tuning errors and tuner drift may reach as much as 500 kilocycles and have to be connected to such a degree that the sound carrier is tuned into the sound trap for rejection of the 920 kilocycle beat between the sound carrier and the color subcarrier. To accomplish this, the frequency must be corrected to within about plus or minus 30 kilocycles.

To effect the desired correction, it is necessary to utilize as large a correction factor as is available. The correction factor may be designated as the ratio of incorrect tuning frequency to corrected tuning frequency. This is especially necessary in color television where its tuner drifts and tuning errors can amount to as much as 500 kilocycles.

Corrections of the amount referred to involves the obtaining of large peak to peak voltage in the frequency discriminator output with a relatively steep rate of change of the voltage through the zero point.

Further, it involves the designing of an oscillator having a component highly sensitive to applied voltage.

It has been explained that the large correction factor that can be employed for VHF can lead to improper operation during UHF operation. This comes about because the strips used for UHF operation employ diodes to generate useable harmonics. For example, the second, third or fourth harmonics may be used to beat the UHF signal to the intermediate frequency for which the major portion for the television circuit is designed.

The particular harmonic used depends upon the particular UHF channel involved. While the use of harmonics in the tuner serves to multiply the oscillator's sensitivity, this can also cause the automatic frequency control or automatic fine tuning to lock out on the sound carrier due to a switching transient in the local oscillator frequency, especially during warming up, or because of improper tuning.

The arrangement of the present invention by means of which the corrective voltage supplied to the local oscillator is substantially reduced during UHF operation, overcomes this drawback and makes the automatic fine tuning or automatic frequency control fully operative without difficulties in both ranges of operation of the television set.

The present invention solves the problems referred to by reducing the sensitivity of the frequency discriminator circuit during UHF operation in the manner illustrated and described while, at the same time, obtaining a suitably large corrective factor during VHF operation. The adjustment of the signal to the local oscillator is accomplished automatically by turning the tuner into any of the UHF positions into any VHF positions.

It will be understood that modifications and adaptations may be made in the structure and procedure, illustrated and described, and falling within the scope of the appended claims.

What is claimed is:

1. In a fine tuning system for a television having a tuner with VHF and UHF ranges; said television comprising local oscillator means having a respective basic frequency for each channel in each of said ranges of the tuner for beating a received signal to a predetermined intermediate frequency signal, a frequency discriminator having an input responsive to said predetermined intermediate frequency signal so as to receive a signal which varies in frequency with variations in frequency of the television local oscillator means, said oscillator means comprising circuit component means the impedance of which is variable in response to an applied voltage, variations in the impedance of said component means being operable to change the frequency of said oscillator means, first means connecting the output of said frequency discriminator to said component means in both ranges of said tuner, and second means operable for reducing the voltage supplied from said frequency discriminator to said component means in the UHF range only of said tuner.

2. A fine tuning system according to claim 1 further comprising switch means having first and second contact means, wherein said first means includes a first resistor connected at one end to the output of said frequency discriminator and at the other end to said component means, and said second means comprising a second resistor connected at one end to the component means end of said first resistor and at the other end being connected to said first contact means, and said second contact means connected to ground and engaging said first contact means in the UHF range only of said tuner.

3. A fine tuning system according to claim 2, in which said television includes a UHF adapter, said other end of said second resistor coupled to said adapter and in which said adapter comprises a UHF antenna input network, said UHF antenna network having two terminals which are connected to opposite ends of a transformer coil in the UHF range of said tuner, said other end of said second resistor being connected to one of said terminals of said antenna network, said second contact means being connected to an intermediate point of said transformer coil.

4. In an oscillator for a television having a tuner with both VHF and UHF ranges, said oscillator comprising capacitance and being variable in frequency in accordance with changes in said capacitance, a diode forming at least a part of said capacitance and being variable in capacitance in response to changes in the bias thereon, a frequency discriminator having an output which is zero when the frequency of said oscillator is at such a value that an incoming signal is beat down to a prescribed intermediate frequency signal, said discriminator output voltage varying in one direction from zero when the oscillator frequency is above said correct value and in the other direction when the oscillator frequency is below said correct value, a resistive voltage divider having one end connected to said discriminator output and having an intermediate point connected to said diode thereby to effect corrective adjustments in the bias on said diode in conformity with variations in the oscillator frequency from the said correct value thereof, and switch means operated by said tuner being in the UHF range only for connecting to ground that end of said voltage divider remote from said frequency discriminator.

5. The method of operating a fine tuning system for a television having a tuner with both VHF and UHF rages and in which the voltage of the output of a frequency discriminator is employed to adjust the frequency of the local oscillator for each position of the tuner, said method consisting of reducing the voltage supplied by the frequency discriminator to the oscillator for UHF range positions of the tuner while supplying the voltage of the frequency discriminator substantially without reduction to the oscillator for VHF settings of the tuner.

* * * * *